United States Patent
Moon et al.

(10) Patent No.: US 11,203,012 B2
(45) Date of Patent: Dec. 21, 2021

(54) NB-DOPED NICKEL OXIDE-ZIRCONIA COMPOSITE CATALYST AND PROCESS FOR PREPARING THE SAME

(71) Applicant: SOGANG UNIVERSITY RESEARCH & BUSINESS DEVELOPMENT FOUNDATION, Seoul (KR)

(72) Inventors: Jun Hyuk Moon, Seoul (KR); Cheol Ho Kim, Seoul (KR); Min Jae Jeong, Chungcheongnam-do (KR)

(73) Assignee: SOGANG UNIVERSITY RESEARCH & BUSINESS DEVELOPMENT FOUNDATION, Seoul (KR)

(*) Notice: Subject to any disclaimer, the term of this patent is extended or adjusted under 35 U.S.C. 154(b) by 0 days.

(21) Appl. No.: 16/545,480

(22) Filed: Aug. 20, 2019

(65) Prior Publication Data
US 2020/0061589 A1 Feb. 27, 2020

(30) Foreign Application Priority Data
Aug. 22, 2018 (KR) .................. 10-2018-0098263

(51) Int. Cl.
*B01J 23/00* (2006.01)
*B01J 23/847* (2006.01)
(Continued)

(52) U.S. Cl.
CPC .......... *B01J 23/8474* (2013.01); *B01J 37/04* (2013.01); *B01J 37/08* (2013.01); *B01J 2523/48* (2013.01);
(Continued)

(58) Field of Classification Search
CPC ........ B01J 23/8474; B01J 37/04; B01J 37/08; B01J 2523/847; B01J 2523/57;
(Continued)

(56) References Cited

U.S. PATENT DOCUMENTS 6,180,828 B1   1/2001   Toshio et al.
2008/0081017 A1*   4/2008   Zhou .................. B01J 23/44
                                                    423/584
(Continued)

FOREIGN PATENT DOCUMENTS

AU   2016269476 A1 * 12/2016   ........... C01G 45/006
CN   1036710 A   11/1989
(Continued)

OTHER PUBLICATIONS

Lee et al. "Enhanced ethylene productivity by the promotion of lattice oxygen in Ni—Nb—O/CexZr1-xO2 composite for oxidative dehydrogenation of ethane." Catalysis Communications, vol. 95, Mar. 4, 2017, pp. 58-62 (Year: 2017).*
(Continued)

*Primary Examiner* — Haytham Soliman
(74) *Attorney, Agent, or Firm* — Myers Bigel, P.A.

(57) ABSTRACT

Provided are a Nb-doped nickel oxide-zirconia composite catalyst, and a method for preparing the same. An excellent methane modification reaction is performed by doping a nickel oxide site with niobium, so that alcohol may be prepared at low costs.

13 Claims, 6 Drawing Sheets

(51) Int. Cl.
  *B01J 37/04* (2006.01)
  *B01J 37/08* (2006.01)
(52) U.S. Cl.
  CPC ...... *B01J 2523/57* (2013.01); *B01J 2523/847* (2013.01)
(58) Field of Classification Search
  CPC .. B01J 2523/48; B01J 2523/00; B01J 35/023; B01J 35/002; B01J 37/088; B01J 35/0033; B01J 21/066; B01J 35/0006
  USPC .......................................................... 502/337
  See application file for complete search history.

(56) References Cited

U.S. PATENT DOCUMENTS

2014/0045678 A1  2/2014  Kumta et al.
2016/0289073 A1  10/2016  Bal et al.

FOREIGN PATENT DOCUMENTS

JP    2000-5604    6/1998
JP    4689508      2/2011

OTHER PUBLICATIONS

Balgis et al. "Synthesis of uniformly porous NiO/ZrO2 particles" Marterials Research Bulletin, 46(5):708-715 (2011).
Ramirez-Cabrera et al. "Methane conversion over Nb-doped ceria" Catalysis Today, 78(1-4):433-438 (2003).

* cited by examiner

NB-DOPED NICKEL OXIDE-ZIRCONIA COMPOSITE CATALYST AND PROCESS FOR PREPARING THE SAME

CROSS-REFERENCE TO RELATED APPLICATIONS

This application claims priority to and the benefit of Korean Patent Application No. 10-2018-0098263 filed in the Korean Intellectual Property Office on Aug. 22, 2018, the entire contents of which are incorporated herein by reference.

TECHNICAL FIELD

The present invention relates to a Nb-doped nickel oxide-zirconia composite catalyst which is excellent in methane conversion activity, and a method for preparing the same.

BACKGROUND ART

Methane, which is a main component of gas, has problems with transportation and storage unlike liquid petroleum resources due to physical properties, so that when the production site is far away from the market, the use thereof is limited. It is possible to increase the added value of the gas, of which the use is so limited and of which the value is low, by physical liquefaction (LNG) or chemical conversion.

In the chemical methane conversion method, an indirect conversion route via a syngas ($CO/H_2$) is used. In order to produce the syngas in the indirect conversion route, there are a reforming process, a Fischer-Tropsch (FT) synthesis process for producing olefin or a liquid hydrocarbon from the syngas, a process for synthesizing methanol from the syngas, a process for producing gasoline or olefin via methanol, and the like, and through these processes, almost all fuel and chemical products, which may be obtained from existing petroleum-based raw materials, may be obtained from methane.

In brief, the conversion process of methane goes through a two-step process including a dry reforming reaction that produces a syngas by a partial oxidation reaction of methane and a process for producing products from the syngas. The standard reaction enthalpy of the dry reforming reaction is 247 kJ/mol, and such a process requires a catalyst under high temperature conditions. Accordingly, most of the methane conversion catalyst studies have been conducted from the viewpoint of cost reduction of commercialized processes targeting the conversion of methane into a syngas at lower temperature.

However, the conversion into the syngas is inefficient because the conversion goes through CO as an intermediate. Accordingly, studies on directly converting methane into products have become gradually important. The direct conversion of methane directly produces products by a reaction of a partial oxidation of methane (hereinafter, referred to as POM) or by a reaction of an oxidative coupling of methane (hereinafter, referred to as OCM). Since the direct conversion of methane directly obtains products, the selectivity is an important point.

Between the reactions, the partial oxidation reaction is generally advantageous in obtaining a specific product because the partial oxidation reaction exhibits high selectivity toward the specific product as compared to the OCM reaction. For the direct conversion of methane, numerous studies on a reaction of obtaining methanol and formaldehyde have been conducted.

A study using a $V_2O_5/SiO_2$ catalyst, which was conducted by Vafajoo et al., achieved methanol selectivity of 91.9 to 93.4%, but exhibited a low methane conversion rate of 0.66 to 1.52% and requires a high temperature and high pressure process at 450 to 500° C. and 20 to 120 bar.

A study conducted by Zhang et al., achieved methanol selectivity of 63% and a yield of 7 to 8%, but requires conditions of a high temperature of 430 to 470° C. and a high pressure of 5 MPa.

A study conducted by Ceri Hammond et al., accomplished a conversion of methane into methanol by using a Cu-ZSM-5 catalyst under NO conditions, but still requires high temperature conditions at 150° C. and exhibited low selectivity and a low yield.

A study conducted by Jun Xu et al., achieved methanol selectivity of 92% at low temperature by using a Cu- and Fe-improved ZSM-5 catalyst, but exhibited a very low methane conversion of 0.5%.

SUMMARY OF THE INVENTION

The present invention has been made in an effort to provide a Nb-doped nickel oxide-zirconia composite catalyst capable of preparing alcohol at low costs by more efficiently oxidizing methane, and a method for preparing the same.

An exemplary embodiment of the present invention provides a Nb-doped nickel oxide-zirconia composite catalyst, in which the Nb is included in an amount of 0.01 to 0.15 mol based on 1 mol of the composite catalyst.

Another exemplary embodiment provides a method for preparing the composite catalyst, the method including: obtaining a precursor mixture solution by dissolving a niobium oxide precursor, a nickel oxide precursor, and a zirconia precursor in an organic solvent; drying the precursor mixture solution; and sintering the dried product.

According to an aspect of the present invention, a higher oxidation current value is exhibited by doping a nickel oxide site with niobium than a nickel oxide-zirconia composite catalyst in the related art, so that alcohol may be obtained by more efficiently oxidizing methane.

DETAILED DESCRIPTION

Figure 1A:
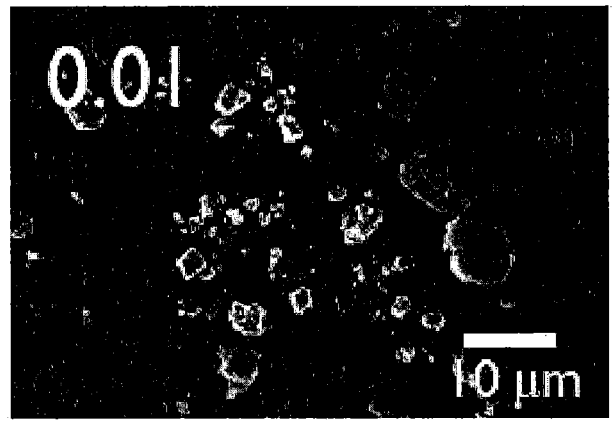
FIG. 1A is an electron microscope photograph (magnification: 2,000 times) of a Nb-doped nickel oxide-zirconia composite catalyst prepared according to Example 1 of the present invention.
Figure 1B:
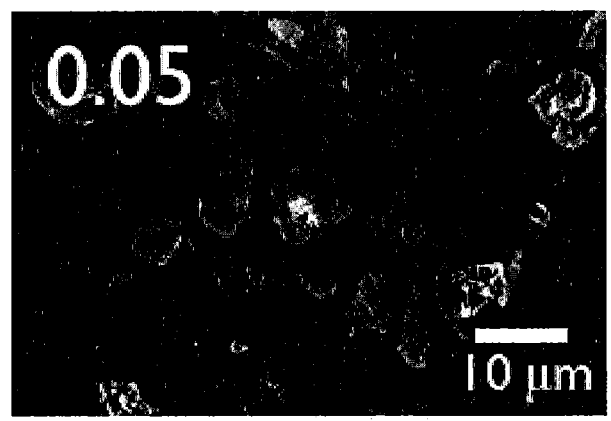
FIG. 1B is an electron microscope photograph (magnification: 2,000 times) of a Nb-doped nickel oxide-zirconia composite catalyst prepared according to Example 2 of the present invention.
Figure 1C:
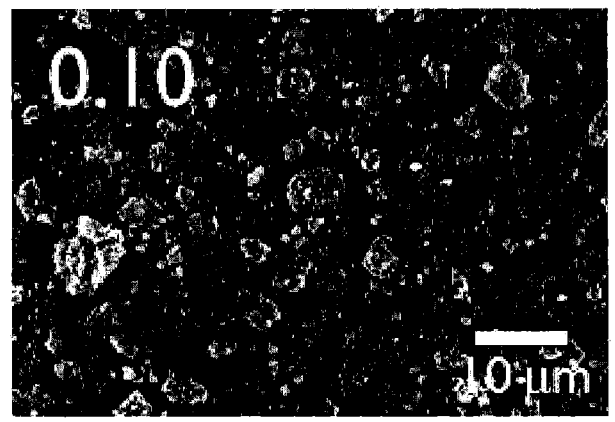
FIG. 1C is an electron microscope photograph (magnification: 2,000 times) of a Nb-doped porous nickel oxide-zirconia composite catalyst prepared according to Example 3 of the present invention.
Figure 1D:
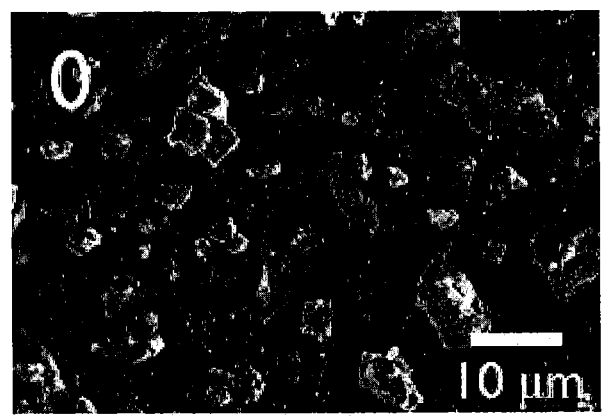
FIG. 1D is an electron microscope photograph (magnification: 2,000 times) of a nickel oxide-zirconia composite catalyst prepared according to Comparative Example 1 of the present invention.
Figure 1E:
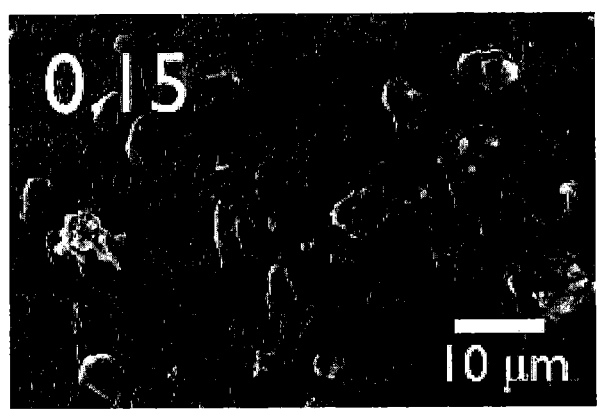
FIG. 1E is an electron microscope photograph (magnification: 2,000 times) of a nickel oxide-zirconia composite catalyst prepared according to Example 4 of the present invention.

Hereinafter, a Nb-doped nickel oxide-zirconia composite catalyst according to an exemplary embodiment, and a method for preparing the same will be described in more detail.

The Nb-doped nickel oxide-zirconia composite catalyst according to an aspect of the present invention includes the niobium in an amount of 0.01 to 0.15 mol based on 1 mol of the composite catalyst.

In the Nb-doped nickel oxide-zirconia composite catalyst according to an aspect of the present invention, the nickel oxide-zirconia composite catalyst is doped with niobium in a content within the above range, so that alcohol may be efficiently obtained due to a high methane conversion rate.

The niobium may be niobium dioxide doped on a nickel oxide site. In this case, the nickel oxide is present in a cubic phase, and the niobium dioxide and the zirconia may be present in a tetragonal phase. In the composite catalyst according to an exemplary embodiment of the present invention, in which the nickel oxide site is doped with niobium dioxide, niobium dioxide serves as a Lewis acid as a lower valence dopant, so that during the process in which methane is adsorbed and oxidized onto the surface of the catalyst, the energy of oxygen vacancy formation may be lowered by strongly attracting oxygen which is a Lewis base.

The Nb-doped nickel oxide-zirconia composite catalyst according to an exemplary embodiment of the present invention may have an average particle diameter of 1 to 50 µm, 5 to 20 µm, or 5 to 10 µm, but the average particle diameter is not limited thereto.

The composite catalyst according to an exemplary embodiment of the present invention may have a mol ratio of nickel oxide to zirconia of 9.9:0.1 to 4.0:6.0, 9.0:1.0 to 4.0:6.0, for example, 9.0:1.0, 8.0:2.0, 7.0:3.0 or 6.0:4.0, but the mol ratio is not limited thereto.

The Nb-doped nickel oxide-zirconia composite catalyst may have a specific surface area (BET) of 1 to 1,000 $m^2/g$, for example, 10 to 1000 $m^2/g$, 20 to 1000 $m^2/g$, 30 to 1000 $m^2/g$, 40 to 1000 $m^2/g$, 50 to 1000 $m^2/g$, 60 to 1000 $m^2/g$, 70 to 1000 $m^2/g$, 1 to 800 $m^2/g$, 10 to 800 $m^2/g$, 20 to 800 $m^2/g$, 30 to 800 $m^2/g$, 40 to 800 $m^2/g$, 50 to 800 $m^2/g$, 60 to 800 $m^2/g$, 70 to 800 $m^2/g$, 1 to 600 $m^2/g$, 10 to 600 $m^2/g$, 20 to 600 $m^2/g$, 30 to 600 $m^2/g$, 40 to 600 $m^2/g$, 50 to 600 $m^2/g$, 60 to 600 $m^2/g$, 70 to 600 $m^2/g$, 1 to 400 $m^2/g$, 10 to 400 $m^2/g$, 20 to 400 $m^2/g$, 30 to 400 $m^2/g$, 40 to 400 $m^2/g$, 50 to 400 $m^2/g$, 60 to 400 $m^2/g$, 70 to 400 $m^2/g$, 1 to 200 $m^2/g$, 10 to 200 $m^2/g$, 20 to 200 $m^2/g$, 30 to 200 $m^2/g$, 40 to 200 $m^2/g$, 50 to 200 $m^2/g$, 60 to 200 $m^2/g$, 70 to 200 $m^2/g$, 1 to 100 $m^2/g$, 10 to 100 $m^2/g$, 20 to 100 $m^2/g$, 30 to 100 $m^2/g$, 40 to 100 $m^2/g$, 50 to 100 $m^2/g$, 60 to 100 $m^2/g$ or 70 to 100 $m^2/g$, for example, 70 $m^2/g$.

The methane oxidation reaction by the electrochemical reaction goes through a process in which $CO_3^{2-}$ is adsorbed onto zirconia, and methane activated by nickel oxide and niobium dioxide is oxidized by $O^{2-}$ transferred from the surface of zirconia. Accordingly, it is ideal that nickel oxide, niobium dioxide, and zirconia elements are present in a uniformly dispersed state.

Since the tetragonal phase zirconia has Lewis acid sites which are approximately 3.5 times more than those of the monoclinic phase zirconia, the tetragonal phase zirconia has a structure which is advantageous in an electrochemical methane oxidation reaction in carbonate ion adsorption characteristics.

Nickel is known to have an excellent performance in activating the C—H bond of methane. Under high temperature conditions, it is possible to oxidize methane while providing oxygen ions along with the activation of methane. However, it is difficult to break the C—H bond of methane and provide oxygen ions under room temperature conditions. Nickel oxide in an alkaline solution is present in the form of $Ni^{2+}$, and has a characteristic in which electric current flows as a p-type semiconductor at room temperature.

Zirconia is known to adsorb carbonate well. However, zirconia has a bonding interval of about 5 eV, so that electrons cannot be transferred, and an electrochemical reaction cannot occur when zirconia is used alone. Accordingly, when zirconia is used alone, it is difficult for a reaction of oxidizing methane to occur because it is difficult for a reaction of electrochemically reducing $CO_3^{2-}$ to $CO_2$ to occur.

Therefore, in a methane oxidation reaction at room temperature, two elements of nickel oxide which serves to activate the C—H bond of methane and zirconia which helps oxidation are essential.

The method for preparing a Nb-doped nickel oxide-zirconia composite catalyst according to another aspect of the present invention includes: obtaining a precursor mixture solution by dissolving a niobium oxide precursor, a nickel oxide precursor, and a zirconia precursor in an organic solvent; drying the precursor mixture solution; and sintering the dried product.

The nickel oxide precursor may be one or more selected from the group consisting of nickel(II) chloride hydrate, nickel(II) acetate tetrahydrate, and nickel(II) nitrate hexahydrate.

The zirconia precursor may be zirconium acetate, or zirconium(IV) oxynitrate hydrate.

The niobium oxide precursor may be ammonium niobate (V) oxalate hydrate or niobium(V) chloride.

The nickel oxide precursor and the zirconia precursor may be mixed at a mol ratio of 10:1 to 8:1, for example, 9:1. When the nickel oxide precursor and the zirconia precursor are used at a ratio within the above range, the $CO_3^{2-}$ adsorption effects may be brought about while reducing the effects of the low conductivity of zirconia which is a non-conductor as an electrochemical catalyst, so that the catalyst efficiency may be high.

The niobium oxide precursor may be used in an amount of 0.7 to 14 parts by weight based on 100 parts by weight of the combined amount of the nickel oxide precursor and the zirconia precursor. When the niobium oxide precursor is used at a ratio within the above range, the catalytically active $NbO_2$ phase may be doped with Nb.

Examples of an organic solvent which may be used in the obtaining of the precursor mixture solution by dissolving the niobium oxide precursor, the nickel oxide precursor, and the zirconia precursor in the organic solvent include one or more selected from methanol, 1-propanol, and 2-propanol.

The amount of organic solvent used is not particularly limited, and the organic solvent may be used in an amount capable of obtaining a solution state in which the precursors are sufficiently dissolved.

Through the drying of the precursor mixture solution, a Nb-doped nickel oxide-zirconia composite catalyst is obtained.

The temperature and time of the drying of the precursor mixture solution are not particularly limited, but the precursor mixture solution may be dried at a temperature of 40 to 100° C., 50 to 90° C., or 60 to 70° C. for 1 to 24 hours, 3 to 12 hours, or 6 to 8 hours.

The temperature and time of the sintering of the dried product are not particularly limited, but the dried product may be sintered at a temperature of 400 to 600° C., 450 to 550° C., or 450 to 500° C. for 1 to 4 hours, 2 to 3 hours, or 2 to 2.5 hours.

After the sintering of the dried product, a Nb-doped nickel oxide-zirconia composite catalyst may be obtained. Alcohol may be prepared using the Nb-doped nickel oxide-zirconia composite catalyst according to an aspect of the present invention.

The method for preparing alcohol may include allowing the Nb-doped nickel oxide-zirconia composite catalyst according to the present invention to react with a solution including methane.

The preparation method may be carried out at 5 to 40° C., 5 to 35° C., 5 to 30° C., 5 to 25° C., 5 to 20° C., 10 to 40° C., 10 to 35° C., 10 to 30° C., 10 to 25° C., 10 to 20° C., 15 to 40° C., 15 to 35° C., 15 to 30° C., 15 to 25° C., 15 to 20° C., 20 to 40° C., 20 to 35° C., 20 to 30° C. or 20 to 25° C., and may be carried out, for example, at 20° C., but the temperature is not limited thereto, and the preparation method may be carried out within a temperature range which does not impair a reactor and electrodes, and the higher the temperature is, the more advantageous the reaction is, but there may occur a problem in that the methane saturation degree is decreased.

The preparation method may be carried out at a pressure of 1 to 20 bar, 1 to 15 bar, 1 to 10 bar, 1 to 5 bar, 1 to 3 bar, 1 to 2 bar or 1 to 1.5 bar, and may be carried out at a pressure of, for example, 1 bar, but the pressure is not limited thereto, and as the pressure is increased within a range which does not impair a reactor, the methane saturation degree in the solution is increased, which is advantageous in the reaction, but the preparation method may be carried out at room pressure in consideration of economic feasibility with respect to the reaction.

The catalyst may be for producing alcohol, formaldehyde, acetaldehyde, or acetone, for example, for producing alcohol, but is not limited thereto.

The alcohol may be methanol, 1-propanol, 2-propanol, or ethanol, but is not limited thereto.

Hereinafter, the present invention will be described in more detail through Examples. These Examples are provided only for more specifically describing the present invention, and it will be obvious to a person with ordinary skill in the art to which the present invention pertains that the scope of the present invention is not limited by these Examples according to the gist of the present invention.

Example 1. Preparation of Nb-Doped NiO—$ZrO_2$ Catalyst (Nb 0.01 mol)

In order to have the mol ratio of Nb—Ni—Zr in the following Table 1, 3.5639 g of nickel(II) chloride hexahydrate (Sigma Aldrich, US), 0.6875 g of a zirconium acetate solution (Sigma Aldrich, US), and 0.0326 g of ammonium niobate(V) oxalate hydrate (supplier: Sigma Aldrich) were added to 12 mL of methanol (Sigma Aldrich, for HPLC, =99.9%), and then dissolved under stirring at room temperature for 2 hours.

And then, after the resulting product was dried at 60° C. on a hot plate, the dried product was sintered at 500° C. for 2 hours by increasing the temperature under a condition of 4° C./min in a muffle furnace, thereby obtaining a nanoparticle Nb-doped NiO—$ZrO_2$ catalyst.

Example 2. Preparation of Nb-Doped Nickel Oxide-Zirconia Catalyst (Nb 0.05 mol)

A Nb-doped nickel oxide-zirconia composite catalyst was obtained in the same manner as in Example 1, except that in order to have the mol ratio of Nb—Ni—Zr in the following Table 1, ammonium niobate oxalate hydrate was used in an amount of 0.05 mol based on 1 mol of a combined amount of nickel(II) chloride hexahydrate (Sigma Aldrich, US) and a zirconium acetate solution.

Example 3. Preparation of Nb-Doped Nickel Oxide-Zirconia Catalyst (Nb 0.10 mol)

A Nb-doped nickel oxide-zirconia composite catalyst was obtained in the same manner as in Example 1, except that in order to have the mol ratio of Nb—Ni—Zr in the following Table 1, ammonium niobate oxalate hydrate was used in an amount of 0.10 mol based on 1 mol of a combined amount of nickel(II) chloride hexahydrate (Sigma Aldrich, US) and a zirconium acetate solution.

Example 4. Preparation of Nb-Doped Nickel Oxide-Zirconia Catalyst (Nb 0.15 mol)

A Nb-doped nickel oxide-zirconia composite catalyst was obtained in the same manner as in Example 1, except that in order to have the mol ratio of Nb—Ni—Zr in the following Table 1, ammonium niobate oxalate hydrate was used in an amount of 0.15 mol based on 1 mol of a combined amount of nickel(II) chloride hexahydrate (Sigma Aldrich, US) and a zirconium acetate solution.

Comparative Example 1. Preparation of Nickel Oxide-Zirconia (NiO—ZrO$_2$) Catalyst Nickel(II) chloride hexahydrate (Sigma Aldrich, US) and a zirconium acetate solution (Sigma Aldrich, US) were added to 12 mL of methanol (Sigma Aldrich, for HPLC, =99.9%) such that the mol ratio of Ni:Zr was 9:1, and dissolved under stirring at room temperature for 2 hours. And then, after the resulting product was dried at 60° C. on a hot plate, dried particles were heated up to 500° C. under a condition of 4° C./min, and then a nanoparticle NiO—ZrO$_2$ catalyst was obtained by maintaining the temperature for 2 hours.

TABLE 1

| Sample | NZ (Comparative Example 1) | 0.01 Nb-NZ (Example 1) | 0.05 Nb-NZ (Example 2) | 0.10 Nb-NZ (Example 3) | 0.15 Nb-NZ (Example 4) |
|---|---|---|---|---|---|
| Mol ratio of Nb (based on 1 mol of combined amount of Ni, Zr, and Nb) | 0 | 0.01 | 0.05 | 0.10 | 0.15 |
| Ni/Zr mol ratio | 9/1 | 89.991/9.999 | 89.955/9.995 | 89.91/9.99 | 89.865/9.985 |

Experimental Example 1. Electron Microscope Image Analysis

Catalyst particles from the catalysts prepared in the Examples and the Comparative Example were attached onto a carbon tape by using an electron microscope (JEOL, Japan), the carbon tape was coated with gold, and then the catalyst were measured at a magnification of 2,000× with an SEM, and the results thereof are illustrated in FIGS. 1A to 1D.

As can be confirmed in FIGS. 1A to 1D, it can be confirmed that all the composite catalysts prepared in the Comparative Examples and the Examples exhibit a form of nanoparticles.

Figure 2A:
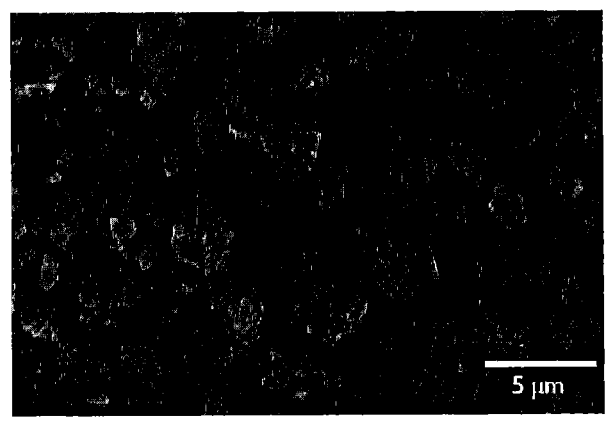
FIG. 2A is an SEM image of a Nb-doped nickel oxide-zirconia composite catalyst prepared according to Example 2 of the present invention (magnification: 5,000 times).

Experimental Example 2. Energy Dispersive Spectroscopy (EDS) Mapping Analysis During the SEM analysis of the composite catalyst prepared in Example 2, an SEM image was captured and illustrated in FIG. 2A, an EDS mapping analysis was performed for Ni and Nb through the EDS analysis function at the corresponding site, and the results thereof are illustrated in FIGS. 2B and 2C, respectively.

Figure 2B:
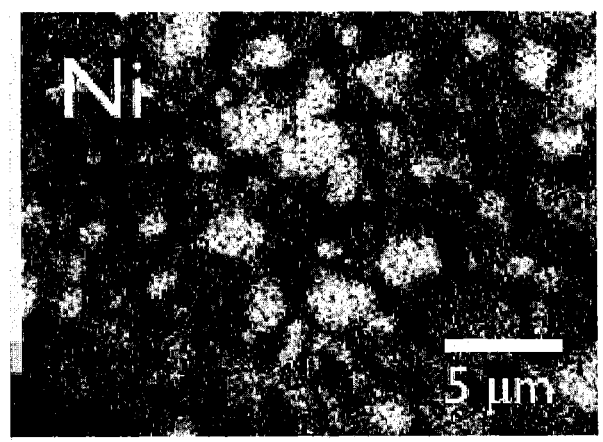
FIG. 2B is an energy dispersive spectroscopy (EDS) analysis result image of the SEM image of the Nb-doped nickel oxide-zirconia composite catalyst in FIG. 2A, which is prepared according to Example 2 of the present invention (magnification: 5,000 times).
Figure 2C:
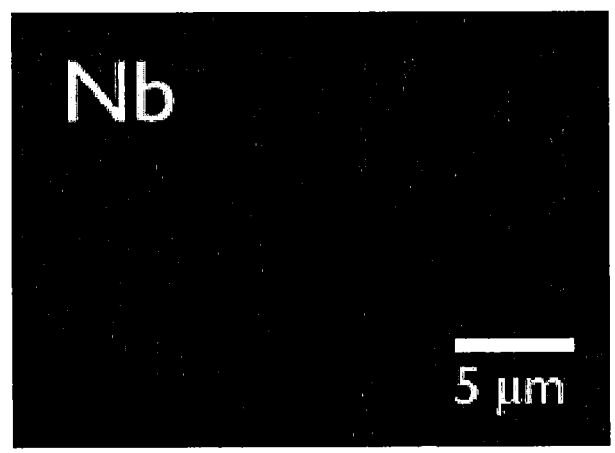
FIG. 2C is an EDS analysis result image of the SEM image of the Nb-doped nickel oxide-zirconia composite catalyst in FIG. 2A, which is prepared according to Example 2 of the present invention (magnification: 5,000 times).

As can be confirmed in FIGS. 2B and 2C, Ni and Nb were present and mixed in the catalyst in Example 2, and each element was uniformly distributed.

Experimental Example 3. Transmission Electron Microscopy (TEM) Analysis 5 mg of the catalyst in Example 2 was dispersed in 1 ml of water with ultrasonic waves for about 5 minutes, and then a TEM (manufacturer JEOL, model name JEM-2100F) analysis was performed by loading the catalyst onto a TEM grid, and the result thereof is illustrated in FIG. 3.

Figure 3:
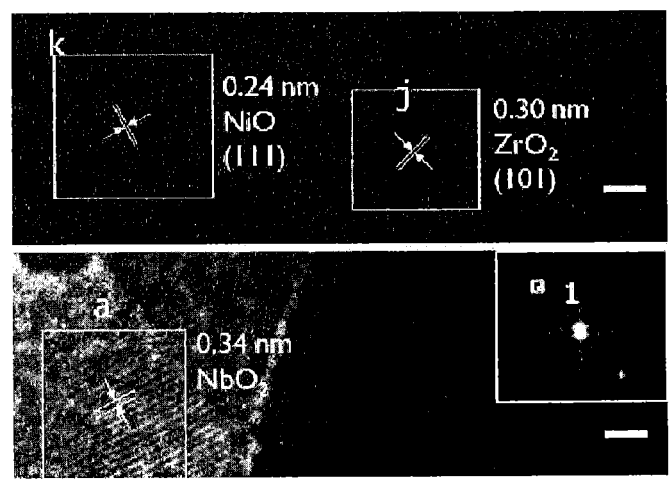
FIG. 3 is a transmission electron microscopy (TEM) image of the Nb-doped nickel oxide-zirconia composite catalyst prepared according to Example 2 of the present invention.

As could be confirmed in FIG. 3, NiO (111) phase of 0.24 nm, ZrO$_2$ (101) phase of 0.30 nm, and NbO$_2$ phase of 0.34 nm were present.

Experimental Example 4. X-Ray Diffraction (XRD) Analysis

Figure 4:
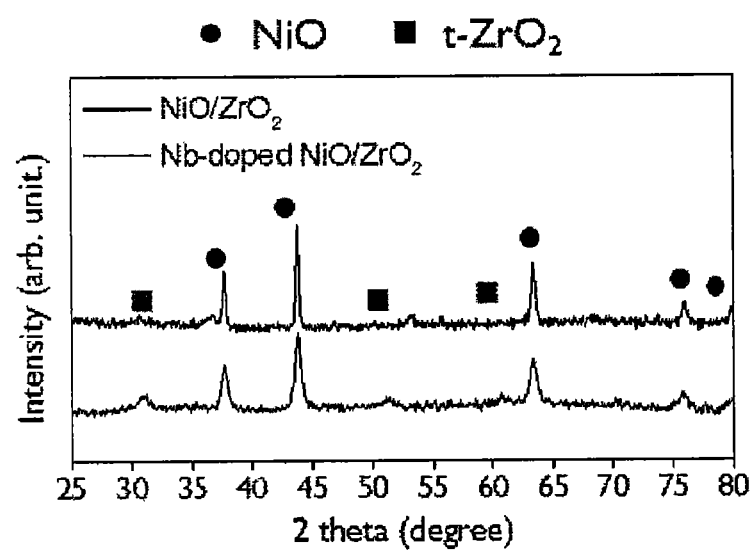
FIG. 4 is a graph showing XRD analysis results of the nickel oxide-zirconia composite catalysts prepared according to Example 2 and Comparative Example 1 of the present invention.

The Nb-doped nickel oxide-zirconia composite catalyst prepared in Example 2 was applied onto a grid, and then while the grid was irradiated with an X-ray beam, the crystallinity of the corresponding particles was analyzed by measuring the diffraction of the beam while changing the angle of the beam into 2 theta/min, and the results thereof are illustrated in FIG. 4 (manufacturer of the used device: Rigaku, model name: MiniFlex).

As can be observed in FIG. 4, cubic phase nickel oxide peaks at 37.2° (111), 43.2° (200), 62.7° (220), 75.2° (311), and 79.3° (222) and tetragonal phase zirconia peaks at 30.3° (101), 50.5° (200), and 60.2° (211) can be confirmed, and it can be seen that when compared with a sample which is not doped with Nb, Nb is present between NiO crystallites from the observation that Ni peaks are broadened and intensities are decreased.

Experimental Example 5. X-Ray Photoelectron Spectroscopy (XPS) Analysis

The Nb-doped nickel oxide-zirconia composite catalyst prepared in Example 2 was subjected to an XPS analysis using an X-ray beam with MXR1 Gun—400 μm 15 kV. Specifically, by using an XPS device manufactured by Thermo Fisher Scientific Inc. (Britain), an X-ray source was monochromated Al Ka (hv=1,486.6 eV), the catalysts were measured at an energy of 300 eV and an energy of 50 eV by scanning the energy at 1 eV and 0.1 eV, respectively, and the results thereof are illustrated in FIG. 5.

Figure 5:
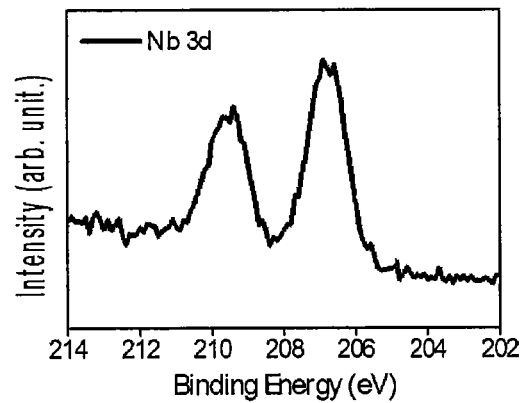
FIG. 5 is a graph showing an X-ray photoelectron spectroscopy (XPS) analysis result of the Nb-doped nickel oxide-zirconia composite catalyst prepared according to Example 2 of the present invention.

As can be confirmed from FIG. 5, XPS peaks of the Nb element appear markedly around 206.6 eV and 209.4 eV, indicating that the Nb element is present in the form of NbO$_2$ instead of the form of Nb$_2$O$_5$ (207.6 eV, 201.4 eV).

Experimental Example 6. Electrochemical Evaluation of Cyclic Voltammetry (CV)

6-1. Electrochemical Evaluation of Composite Catalyst in Example 2

Figure 6A:
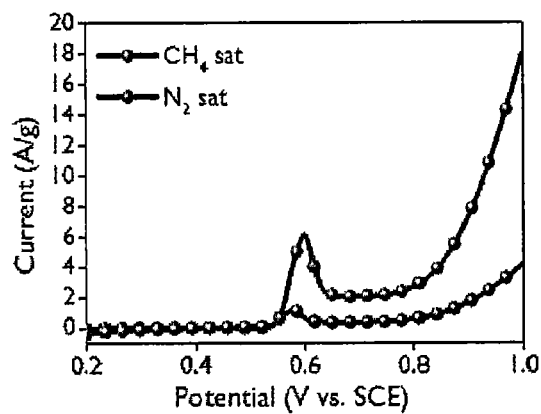
FIG. 6A is a graph showing cyclic voltammetry analysis results of the Nb-doped nickel oxide-zirconia composite catalyst prepared according to Example 2 of the present invention.

After methane and an inert gas nitrogen were each saturated in a 0.5 M Na$_2$CO$_3$ solution, a three-electrode electrochemical evaluation was performed in a 15-ml vial. 12 ug of the composite catalyst prepared in Example 2 was loaded onto a glassy carbon electrode, and then a cyclic voltammetry evaluation was performed from 0.2 V to 1.0 V by using the glassy carbon electrode as a working electrode, an SCE electrode as a reference electrode, and Pt as a counter electrode, and the results thereof are illustrated in FIG. 6A.

As can be confirmed from FIG. 6A, as a result of CV of the nickel oxide, the methane activation at 0.8 V or more could be confirmed. The above reaction obtains a current value increased by about 3.5 times under $CH_4$ saturated conditions as compared to $N_2$ saturated conditions.

6-2. Comparison of Electrochemical Evaluations of Composite Catalysts of Examples and Comparative Example After methane gas was each saturated in a 0.5 M $Na_2CO_3$ solution, a three-electrode electrochemical evaluation was performed in a 15-ml vial.

Figure 6B:
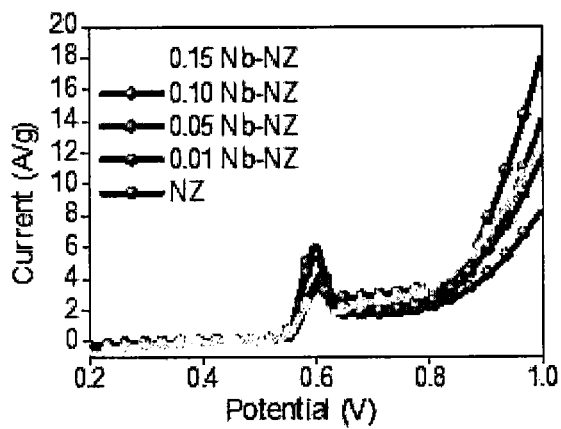
FIG. 6B is a graph showing cyclic voltammetry analysis results of a methane saturated solution of nickel oxide-zirconia composite catalysts prepared according to Examples 1 to 3 and Comparative Example 1 of the present invention.

12 ug of each of the composite catalysts prepared in Examples 1 to 4 and Comparative Example 1 was loaded onto a glassy carbon electrode, and then a cyclic voltammetry evaluation was performed from 0.2 V to 1.0 V by using the glassy carbon electrode as a working electrode, an SCE electrode as a reference electrode, and Pt as a counter electrode, and the results thereof are illustrated in FIG. 6B.

As can be confirmed from FIG. 6B, it was confirmed that as the ratio of the Nb precursor increased, the oxidation current increased, but when the ratio is more than 0.10 mol ratio, the oxidation current slightly decreased. Nb is a strong Lewis base, and forms a bond with oxygen (O). When Nb is present in the form of $NbO_2$, electron deficit is caused on the surface of oxide, which serves as a lower-valence dopant (LVD), so that it is expected to help to absorb the surrounding methane and break the C—H bonds. However, during excessive Nb doping, more than 0.10-Nb mol ratio can be expected to slightly decrease the catalyst performance due to the formation of $Nb_2O_5$ which is an inactive phase.

Experimental Example 7. Qualitative Analysis of Methane Oxidation Reaction Product In order to allow methane in a liquid phase to react, a solution was saturated by supplying methane with a purity of 99.999% to a $Na_2CO_3$ solution at a concentration of 0.5 M for 1 hour, and an empty space of the reactor was fully filled with methane. Next, to both sides of the reactor, a Pt electrode as a cathode was connected and a carbon paper, as an anode, in which the catalyst was uniformly loaded was connected. The composite catalyst prepared in Example 2 was dispersed in water, placed onto the carbon paper, and then dried, and the catalyst was loaded onto the carbon paper electrode by fixing the catalyst using 1 mL of a binder (LDS 521), and the reactor was hermetically sealed and isolated from the outside.

Figure 7:
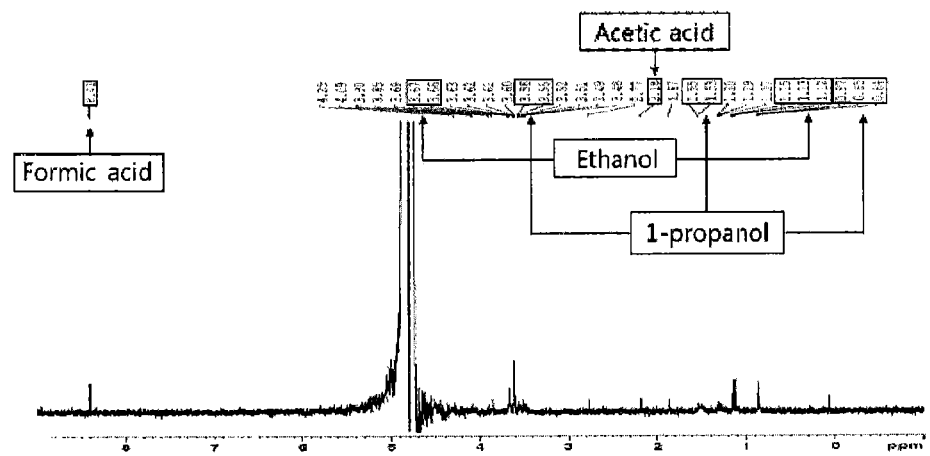
FIG. 7 is a set of NMR spectra of products of a methane oxidation reaction using the Nb-doped nickel oxide-zirconia composite catalyst prepared according to Example 2 of the present invention.

The reaction product was analyzed by $^1$H-NMR after performing a methane oxidation reaction at 1.4 V for 6 hours under normal temperature and normal pressure conditions, and the results thereof are illustrated in FIG. 7.

As can be confirmed from FIG. 7, various peaks may be confirmed by $^1$H-NMR, and ethanol was detected around 1.53, 1.55, 3.55, and 3.56 ppm, 1-propanol was detected around 0.84, 0.85, 0.87, 1.53, 1.55, 3.55, and 3.56 ppm, acetic acid was detected at 2.18 ppm, and form acid was detected at 8.41 ppm.

Experimental Example 8. Quantitative Analysis of Methane Oxidation Reaction Product In order to allow methane in a liquid phase to react, a solution was saturated by supplying methane with a purity of 99.999% to a $Na_2CO_3$ solution at a concentration of 0.5 M for 1 hour, and an empty space of the reactor was fully filled with methane. Next, to both sides of the reactor, a Pt electrode as a cathode was connected and carbon paper, as an anode, in which the catalyst was uniformly loaded was connected. 20 mg of the composite catalyst prepared in Example 2 was dispersed in water, placed onto the carbon paper, and then dried, and the catalyst was loaded onto the carbon paper electrode by fixing the catalyst using 1 mL of a binder (LDS 521), and the reactor was hermetically sealed and isolated from the outside. A methane oxidation reaction was performed at 1.4 V for 6 hours under normal temperature and normal pressure conditions, the reaction product was analyzed by GC/MS, and the results thereof are illustrated in FIG. 8.

Figure 8:
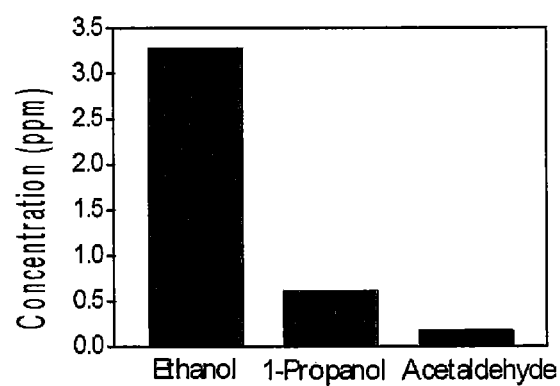
FIG. 8 is a graph showing the results of analyzing the concentrations of products of a methane oxidation reaction using the Nb-doped nickel oxide-zirconia composite catalyst prepared according to Example 2 of the present invention.

As can be confirmed from FIG. 8, as the methane oxidation reaction product, ethanol (EtOH), 1-propanol (1-PrOH), acetaldehyde, and the like were detected, and ethanol was detected at a high ratio (3.28 ppm) as a main product.

What is claimed is:

1. A Nb-doped nickel oxide-zirconia composite catalyst, wherein the niobium is comprised in an amount of 0.01 to 0.15 mol based on 1 mol of the composite catalyst, and
   wherein the composite catalyst consists of the Nb-doped nickel oxide and the zirconia and has a mol ratio of Nb-doped nickel oxide to zirconia of 9.9:0.1 to 8.0:2.0.

2. The composite catalyst of claim 1, wherein the niobium is niobium dioxide doped on a nickel oxide site.

3. The composite catalyst of claim 2, wherein the nickel oxide is present in a cubic phase, and the niobium dioxide and the zirconia are present in a tetragonal phase.

4. The composite catalyst of claim 1, wherein the composite catalyst has an average particle diameter of 1 to 50 μm.

5. A method for preparing the composite catalyst according to claim 1, the method comprising:
   obtaining a precursor mixture solution by dissolving a niobium oxide precursor, a nickel oxide precursor, and a zirconia precursor in an organic solvent;
   drying the precursor mixture solution; and
   sintering the dried product.

6. The method of claim 5, wherein the nickel oxide precursor is one or more selected from nickel(II) chloride hydrate, nickel(II) acetate tetrahydrate, and nickel(II) nitrate hexahydrate.

7. The method of claim 5, wherein the zirconia precursor is zirconium acetate, or zirconium(IV) oxynitrate hydrate.

8. The method of claim 5, wherein the niobium oxide precursor is ammonium niobate(V) oxalate hydrate or niobium(V) chloride.

9. The method of claim 5, wherein the organic solvent is one or more selected from methanol, 1-propanol, and 2-propanol.

10. The method of claim 5, wherein the nickel oxide precursor and the zirconia precursor are mixed at a mol ratio of 10:1 to 8:1.

11. The method of claim 5, wherein the niobium oxide precursor is used in an amount of 0.7 to 14 parts by weight based on 100 parts by weight of a combined amount of the nickel oxide precursor and the zirconia precursor.

12. The method of claim 5, wherein the drying of the precursor mixture solution is performed at a temperature of 40 to 100° C. for 1 to 24 hours.

13. The method of claim 5, wherein the sintering of the dried product is performed at a temperature of 400 to 600° C. for 1 to 4 hours.

\* \* \* \* \*